US008587180B2

(12) United States Patent
Sugita et al.

(10) Patent No.: US 8,587,180 B2
(45) Date of Patent: Nov. 19, 2013

(54) PRESSURE CONTROL VALVE DRIVING CIRCUIT FOR PRESSURE TYPE FLOW RATE CONTROL DEVICE WITH FLOW RATE SELF-DIAGNOSIS FUNCTION

(75) Inventors: Katsuyuki Sugita, Osaka (JP); Nobukazu Ikeda, Osaka (JP); Kouji Nishino, Osaka (JP); Ryousuke Dohi, Osaka (JP); Kaoru Hirata, Osaka (JP); Takatoshi Nakatani, Osaka (JP)

(73) Assignee: Fujikin Incorporated, Osaka (JP)

( * ) Notice: Subject to any disclaimer, the term of this patent is extended or adjusted under 35 U.S.C. 154(b) by 519 days.

(21) Appl. No.: 12/989,614

(22) PCT Filed: Feb. 18, 2009

(86) PCT No.: PCT/JP2009/000647
§ 371 (c)(1),
(2), (4) Date: Jan. 5, 2011

(87) PCT Pub. No.: WO2009/130835
PCT Pub. Date: Oct. 29, 2009

(65) Prior Publication Data
US 2011/0108138 A1 May 12, 2011

(30) Foreign Application Priority Data

Apr. 25, 2008 (JP) ................................ 2008-115479

(51) Int. Cl.
*H01L 41/09* (2006.01)
(52) U.S. Cl.
USPC .................. 310/316.03; 310/316.01; 310/317
(58) Field of Classification Search
USPC .................... 310/316.01, 316.03, 317; 137/14
See application file for complete search history.

(56) References Cited

U.S. PATENT DOCUMENTS

| 5,669,408 A | 9/1997 | Nishino et al. |
| 6,302,130 B1 | 10/2001 | Ohmi et al. |

(Continued)

FOREIGN PATENT DOCUMENTS

| JP | 62-13275 A | 1/1987 |
| JP | 63-106002 A | 5/1988 |

(Continued)

OTHER PUBLICATIONS

International Search Report issued in corresponding International Application No. PCT/JP2009/000647, completed Mar. 6, 2009, mailed Mar. 17, 2009.

*Primary Examiner* — Thomas Dougherty
(74) *Attorney, Agent, or Firm* — Griffin & Szipl, P.C.

(57) ABSTRACT

A pressure control valve piezoelectric element driving circuit is provided for a pressure type flow rate control device provided with a flow rate self-diagnosis function for comparing initial pressure drop characteristics data measured and with pressure drop characteristics data in a flow rate diagnosis which are measured under conditions that are the same for both measurements to detect malfunction in flow rate control from a difference between both characteristics data, wherein a first discharge circuit slowly discharges a piezoelectric element driving voltage applied to the piezoelectric element according to a step-down command signal from a CPU, through a step-down command circuit to step down the voltage, and a second discharge circuit that rapidly discharges a piezoelectric element driving voltage applied to the piezoelectric element according to a high-speed step-down command signal from the CPU, through a high-speed step-down command circuit to step down the voltage.

20 Claims, 8 Drawing Sheets

(56) References Cited

U.S. PATENT DOCUMENTS

| | | |
|---|---|---|
| 6,820,632 B2 * | 11/2004 | Ohmi et al. ................... 137/14 |
| 2010/0037959 A1 * | 2/2010 | Kaimishi et al. ............... 137/14 |
| 2012/0024395 A1 * | 2/2012 | Furukawa et al. ............. 137/14 |

FOREIGN PATENT DOCUMENTS

| | | |
|---|---|---|
| JP | 4-069069 A | 3/1992 |
| JP | 8-338546 | 12/1996 |
| JP | 2000-137528 A | 5/2000 |
| JP | 2005-149075 | 6/2005 |

* cited by examiner

Prior Art

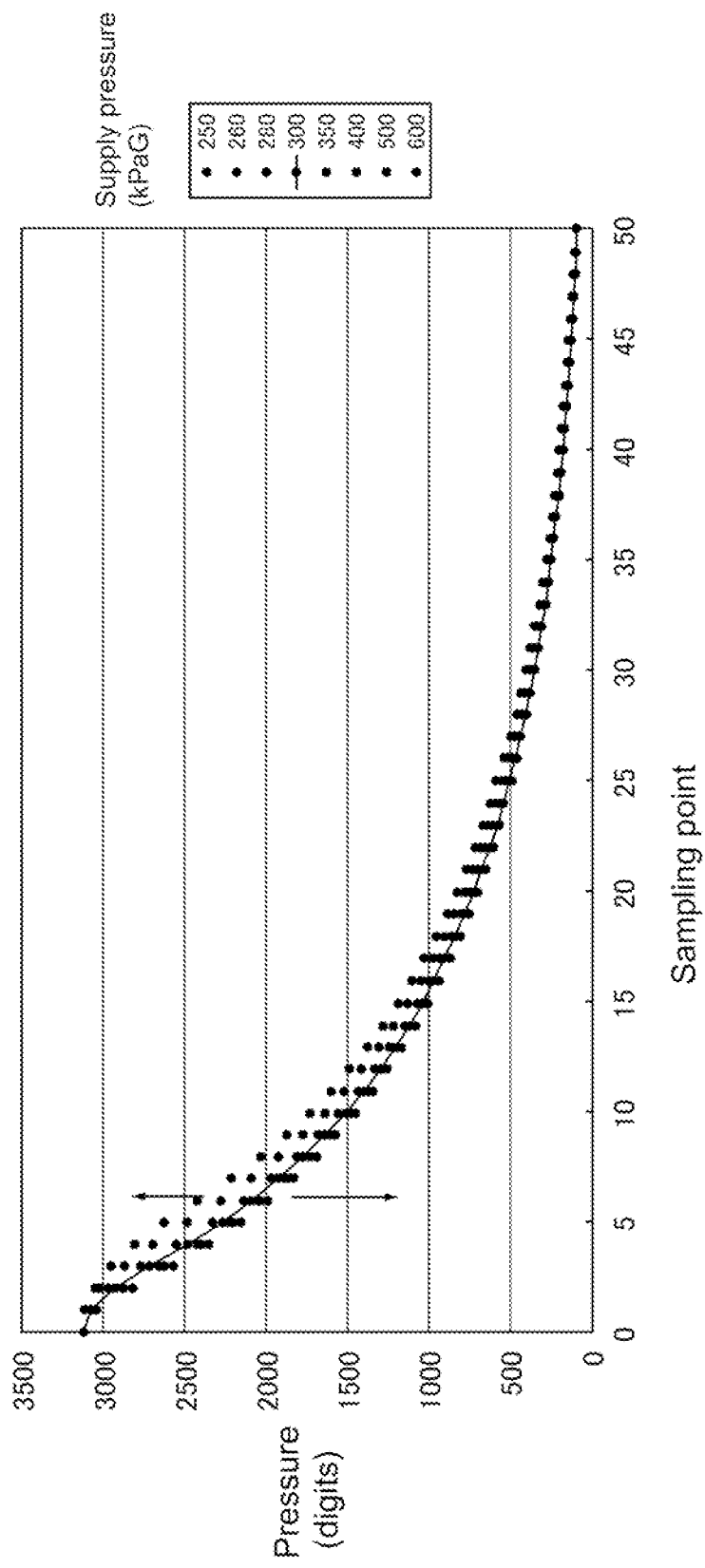
F I G. 6

US 8,587,180 B2

PRESSURE CONTROL VALVE DRIVING CIRCUIT FOR PRESSURE TYPE FLOW RATE CONTROL DEVICE WITH FLOW RATE SELF-DIAGNOSIS FUNCTION

This is a National Phase Application in the United States of International Patent Application No. PCT/JP2009/000647 filed Feb. 18, 2009, which claims priority on Japanese Patent Application No. 2008-115479, filed Apr. 25, 2008. The entire disclosures of the above patent applications are hereby incorporated by reference.

TECHNICAL FIELD OF THE INVENTION

The present invention relates to improvements in a pressure type flow rate control device for gas, or the like, used for manufacturing semiconductors, chemicals, drugs, precision machinery components, or the like. The present invention relates to a pressure control valve driving circuit that is capable of constantly performing highly accurate and stable detection at the time of detecting a change in shape of an orifice due to clogging, cracks, corrosion, or the like, by use of a flow rate self-diagnosis function provided for the pressure type flow rate control device.

BACKGROUND ART/BACKGROUND ART

Pressure type flow rate control devices are capable of highly accurately controlling flow rates of various types of fluids, such as gas, with a simple mechanism in which a piezoelectric element driving type pressure control valve and an orifice are combined. Many of these pressure type flow rate control devices have been provided for practical use in the field of semiconductor manufacturing equipment, or the like.

Furthermore, because the pressure type flow rate control device performs flow rate control by adjusting gas pressure on the upstream side thereof by use of an orifice by controlling a pressure control valve so as to open and close, it is necessary to constantly monitor so-called "clogging" of the orifice hole. Therefore, a function of self-diagnosing with respect to a level of a change in shape due to clogging, cracks, corrosion, or the like, of the orifice, that is a so-called "flow rate self-diagnosis" (or clogging detection) is provided in some systems.

FIG. 5 shows an example of a conventional pressure type flow rate control device FCS provided with a flow rate self-diagnosis function. That is, the gas pressure and the gas temperature in a pipe passage 3, disposed between a pressure control valve 1 and an orifice 2, are detected by a pressure detector $P_1$ and a temperature detector $T_1$, respectively. The detected gas pressure and gas temperature are input to an arithmetic processing unit (CPU). In the arithmetic processing unit (CPU), a gas flow rate Qc passed through the orifice 2 is computed, and a differential flow rate $\Delta Q$ between a setting flow rate Qs and the computed flow rate Qc is computed. A control signal S corresponding to the differential flow rate $\Delta Q$ is input to a piezoelectric element driving unit $1a$, and the pressure control valve 1 is controlled to be opened and closed in the direction required so that the differential flow rate $\Delta Q$ becomes zero.

Then, when the orifice hole diameter of the orifice 2 is changed due to clogging when the pressure type flow rate control device is in use, the pressure drop characteristics in the pipe passage 3 in FIG. 5 are changed. Therefore, the pressure drop characteristics are measured before the pressure type flow rate control device is provided for practical use (i.e., before factory shipment) and are stored as initial values in a memory device M. This makes it possible to determine the presence or absence of malfunction in flow rate control by comparing the initial values with the measured values of the pressure drop characteristics in a diagnostic while that pressure type flow rate control device is in use. That is, the flow rate self-diagnosis is provided in order to self-diagnose the presence or absence of malfunction in flow rate control caused by a change in shape of the orifice hole due to clogging, cracks, corrosion, and the like, of the orifice 2.

In more detail, with reference to FIG. 5, first, before shipment of the pressure type flow rate control device FCS, a gas for flow rate self-diagnosis (usually, an $N_2$ gas) is supplied to the piezoelectric element driving type pressure control valve 1 of the pressure type flow rate control device FCS, and a setting flow rate Qs of the pressure type flow rate control device FCS is set to the flow rate of 100%, and the memory device M is set to an operative state (i.e., setting of an initial value memory signal). It is, as a matter of course, that in the case where the controlling flow rate (i.e., setting flow rate Qs) is less than or equal to a certain threshold value at this time, an alarm $A_L$ corresponding to a deficiency in gas supply pressure is given. Next, the piezoelectric element driving type pressure control valve 1 is rapidly completely closed, and the detected pressure, and time data of the pressure detector $P_1$, are measured at predetermined time intervals and are stored in the memory device M (storage of initial value data).

In a flow rate self-diagnosis of the pressure type flow rate control device FCS when in use, first, a gas, which is the same as the gas used for determining the storage of initial value data, is supplied to the piezoelectric element driving type pressure control valve 1 and, at the same time, a setting flow rate Qs thereof is set to the flow rate of 100%. It is, as a matter of course, that in the case where the controlling flow rate (setting flow rate Qs) is less than or equal to a certain threshold value at this time, an alarm $A_L$ corresponding to deficiency in gas supply pressure is given. Next, the piezoelectric element driving type pressure control valve 1 is rapidly completely closed, and the detected pressure and time data in the pipe passage 3 at this time are measured at predetermined time intervals, and are compared with the initial value data stored in advance in the memory device M in the arithmetic processing unit (CPU). In the case where a difference between both the detected pressure data and time data is greater than the setting value, an alarm indicating that the diagnosis result is abnormal is given. In FIG. 5, the reference character E designates a power supply voltage.

Meanwhile, a normally-closed type metal diaphragm valve, provided with a piezoelectric element driving unit, is utilized as the piezoelectric element driving type pressure control valve 1 of the pressure type flow rate control device FCS in many cases. A driving voltage is applied to the piezoelectric element of the piezoelectric element driving unit $1a$ so as to stretch its entire length, thereby lifting up a valve stem against an elastic force of an elastic body, that opens the valve. Furthermore, when the voltage applied to the piezoelectric element is eliminated, the length of the piezoelectric element is restored to its initial length, and the valve stem is lowered by the elastic force of the elastic body, thereby closing the valve (see, e.g., Japanese Published Unexamined Patent Application No. 2005-149075).

As a result, variation occurs in time from when the valve is fully opened until when the valve is completely closed by necessity according to a speed at which the voltage applied to the piezoelectric element is eliminated (hereinafter, called "delay in dropping of a piezoelectric element driving voltage"). In addition, a time position at the first sampling point in measurement of the pressure drop characteristics (i.e., sampling start time) fluctuates, which makes it difficult to precisely measure the pressure drop characteristics. In addition, the greater the amount of displacement in stroke of the piezoelectric element, the greater the piezoelectric element driving voltage, and the greater the outer diameter of the valve disc, then the greater is the influence on the pressure drop characteristics caused by the delay in dropping of the piezoelectric element driving voltage. Furthermore, the shorter the sampling time for a diagnostic, the greater is the influence on the pressure drop characteristics caused by the delay in dropping of the piezoelectric element driving voltage.

FIG. 6 shows an example of pressure drop characteristics of the conventional pressure type flow rate control device (FCS type: manufactured by Fujikin Incorporated). It is clear from FIG. 6 that, as the gas supply pressure (kPaG) is lowered, even the pressure drop characteristics curve of the same pressure type flow rate control device moves upward.

Furthermore, FIG. 7 shows research data of the influence on the diagnosis results (%) caused by a change in pressure drop characteristics due to a fluctuation in gas supply pressure. Generally, in the normally-closed type piezoelectric element driving type pressure control valve 1, when the supply pressure is low, the piezoelectric element voltage becomes higher than in the case where the supply pressure is high, which makes it easy for the pressure control valve closing time delay to occur (Japanese Published Unexamined Patent Application No. 2005-149075). As a result, when the supply pressure is lowered, the piezoelectric element driving voltage rises to increase the pressure control valve closing time delay, and the diagnosis result (%) fluctuates toward the positive side as shown in FIG. 7.

FIG. 8 is a block diagram showing the configuration of a piezoelectric element driving circuit of the conventional piezoelectric element driving type pressure control valve. A driving voltage is supplied to the piezoelectric element (capacitance C) from the power supply through a field-effect transistor $FET_1$, an inductor L, and a diode D from the arithmetic processing unit (CPU) of the pressure type flow rate control device FCS. In more detail, when a field-effect transistor $FET_2$ is turned on by a step-up command signal from the CPU, a voltage is induced in the inductor L and, thereafter, when the field-effect transistor $FET_2$ is turned off, the induced voltage in the inductor L is superimposed on the driving voltage. Then, the voltage on which the induced voltage is superimposed is applied (charged) as a piezoelectric element driving voltage to the piezoelectric element (i.e., modeled as a capacitor). Furthermore, in the case wherein pressure rising continues, the field-effect transistor $FET_2$ is repeatedly turned on and off. Furthermore, the entire length of the piezoelectric element stretches by charging the piezoelectric element, which opens the pressure control valve.

On the other hand, in the case when the pressure control valve is completely closed, a step-down field-effect transistor $FET_3$ is turned on by input of a step-down command signal from the CPU to discharge the charged voltage of the piezoelectric element (i.e., modeled as a capacitor). Consequently, the piezoelectric element contracts, and the pressure control valve is closed by a spring elastic force.

Patent Document 1: Japanese Published Unexamined Patent Application No. H8-338546

Patent Document 2: Japanese Published Unexamined Patent Application No. 2000-137528

Patent Document 3: Japanese Published Unexamined Patent Application No. 2005-149075

PROBLEMS TO BE SOLVED BY THE INVENTION

As described above, in the conventional pressure type flow rate control device provided with the flow rate self-diagnosis function, measurement of pressure drop characteristics is performed by closing the piezoelectric driving type pressure control valve in a flow rate self-diagnosis/self-diagnostic. However, with respect to the pressure drop characteristics measured at this time, the form of the characteristics curve may change when the magnitude of supply gas pressure changes, or the piezoelectric element driving voltage changes, or the pressure drop characteristics curve may fluctuate even during measurement under identical conditions. Therefore, there is a problem in that it is impossible to promptly perform highly accurate diagnosis in a self-diagnostic for flow rate control based on comparison between pressure drop characteristics curves provided before start of use of the device (i.e., in an initial state) and when using the device during a diagnosis (i.e., during the self-diagnostic).

The present invention is intended to solve the problem(s) as described above and encountered in a conventional diagnosis system and method used for diagnosing malfunction in flow rate control, i.e., in a self-diagnostic for diagnosing malfunction in flow rate control by detecting a change in shape of an orifice due to clogging, cracks, corrosion, or the like, of the orifice. In other words, the problem previously encountered in the art is that, when the magnitude of supply gas pressure or piezoelectric element driving voltage changes, it is impossible to stably obtain a precise pressure drop characteristics curve, which makes it impossible to perform highly accurate diagnosis of flow rate control. More specifically, then, an object of the present invention is to provide a piezoelectric element driving circuit for a pressure control valve of a pressure type flow rate control device that is provided with a flow rate self-diagnosis function, in which it is possible to constantly obtain a stable pressure drop characteristics curve regardless of whether the supply gas pressure, or the piezoelectric element driving voltage, is high or low by considerably shortening a time delay from when a completely-closing signal is supplied to the pressure control valve provided with the piezoelectric element driving unit until when the pressure control valve is completely closed. In other words, the time delay corresponds to a time needed for switching the valve from being fully opened to being completely closed, which is shortened in accordance with the present invention, thereby making it possible to highly accurately diagnose malfunction in flow rate control (i.e., to diagnose/detect a change in shape of an orifice due to clogging, cracks, corrosion, or the like, of the orifice).

SUMMARY OF THE INVENTION (MEANS FOR SOLVING THE PROBLEMS)

The invention according to a first embodiment of the invention has the basic configuration of a pressure control valve driving circuit for a pressure type flow rate control device, which is provided with a flow rate self-diagnosis function for comparing initial pressure drop characteristics data measured and stored in advance with pressure drop characteristics data determined during a flow rate diagnosis, wherein the pressure drop characteristics determined during the flow rate self-diagnostic are measured under the same conditions as those used for the measurement of the initial pressure drop characteristics, which are used to detect malfunction in flow rate control from a difference between both characteristics data, in which a closing circuit for closing a control valve at a high speed is provided in parallel with a control valve driving circuit.

The invention, according to a second embodiment, is that in the invention according to the first embodiment, the pressure control valve driving circuit is a pressure control valve piezoelectric element driving circuit for operating a piezoelectric element driving type pressure control valve, and the closing circuit for closing the control valve at a high speed is a second discharge circuit that rapidly discharges a piezoelectric element driving voltage applied to the piezoelectric element according to a high-speed step-down command signal received from an arithmetic processing unit (CPU), through a high-speed step-down command circuit to step down the voltage.

The invention, according to a third embodiment, is that in the invention according to the second embodiment, a modification is made so that the second discharge circuit is composed of (a) a series circuit of a low-resistance and (b) a switching element of the high-speed step-down command circuit that is made conductive, according to an input of the high-speed step-down command signal.

The invention according to a fourth embodiment is that, in the invention according to the second embodiment or the third embodiment, a modification is made so that a first discharge circuit that discharges a piezoelectric element driving voltage applied to the piezoelectric element according to the step-down command signal from the arithmetic processing unit (CPU) of the pressure type flow rate control device, through the step-down command circuit to step down the voltage, is provided in parallel with the second discharge circuit.

The invention according to a fifth embodiment is that, in the invention according to the fourth embodiment, the first discharge circuit is composed of a series circuit of a high-resistance and a switching element of the step-down command circuit, which is made conductive according to an input of a step-down command signal.

The invention according to a sixth embodiment is that, in the invention according to any one of the second embodiment, the third embodiment, and the fourth embodiment, are further modified so that a time constant of the second discharge circuit is set to 0.3 msec or less.

EFFECTS OF THE INVENTION

In accordance with the present invention, in the pressure control valve driving circuit for the pressure type flow rate control device, which is provided with the flow rate self-diagnosis function, a closing circuit for closing a control valve at a high speed is provided in parallel with a control valve driving circuit. Therefore, it is possible to rapidly switch the pressure control valve from being fully opened to being completely closed in a manner that considerably shortens the valve closing time delay of the pressure control valve. In accordance with these features of the invention, it is possible to highly accurately and stably perform measurement of pressure drop characteristics in a flow rate self-diagnostic, which leads to a highly accurate diagnosis result of the flow rate self-diagnostic.

In particular, in the pressure control valve piezoelectric element driving circuit intended for the pressure control valve provided with the piezoelectric element driving unit, a first discharge circuit, which discharges a piezoelectric element driving voltage applied to the piezoelectric element according to an input of a step-down command signal, steps down the voltage through a step-down command circuit, and a second discharge circuit, which rapidly discharges a piezoelectric element driving voltage applied to the piezoelectric element according to an input of a high-speed step-down command signal, steps down the voltage through a high-speed step-down command circuit. The first discharge circuit and the second discharge circuit are provided in parallel with a piezoelectric element driving voltage supply circuit, and usual flow rate control is performed by stepping down a piezoelectric element driving voltage through the first discharge circuit, and, in a flow rate control diagnostic, a piezoelectric element driving voltage is rapidly discharged to be stepped down through the second discharge circuit. With the above-described configuration, it is possible to smoothly and stably perform usual flow rate control, and to rapidly switch the piezoelectric element driving type pressure control valve from being fully opened to being completely closed in a flow rate control diagnostic. As a result, the pressure control valve closing time delay is considerably shortened, which makes it possible to highly accurately and stably perform measurement of pressure drop characteristics in a flow rate self-diagnostic, which leads to a highly accurate and stable diagnostic result of the flow rate self-diagnostic.

BRIEF DESCRIPTION OF THE DRAWINGS

FIG. 6 shows the pressure drop characteristics in the case where gas supply pressure to a pressure control valve 1 from the pressure type flow rate control device FCS differs.

DESCRIPTION OF SYMBOLS

1: pressure control valve, 1a: piezoelectric element driving unit, 2: orifice, 3: pipe passage, 4: piezoelectric element, 5: piezoelectric element driving circuit, 6: step-up command circuit, 7: step-down command circuit, 8: high-speed step-down command circuit, 9: piezoelectric voltage signal feedback circuit, 10: arithmetic processing unit (CPU), 11 to 16: input terminals, 17 to 18: output terminals to piezoelectric element, FCS: pressure type flow rate control device, E: power supply, M: memory device, Qc: computed flow rate, Qs: setting flow rate, ΔQ: Qs-Qc, S: control signal, $P_1$: pressure detector, $T_1$: temperature detector.

DETAILED DESCRIPTION OF THE INVENTION, WITH BEST MODES FOR CARRYING OUT THE INVENTION

Figure 1:
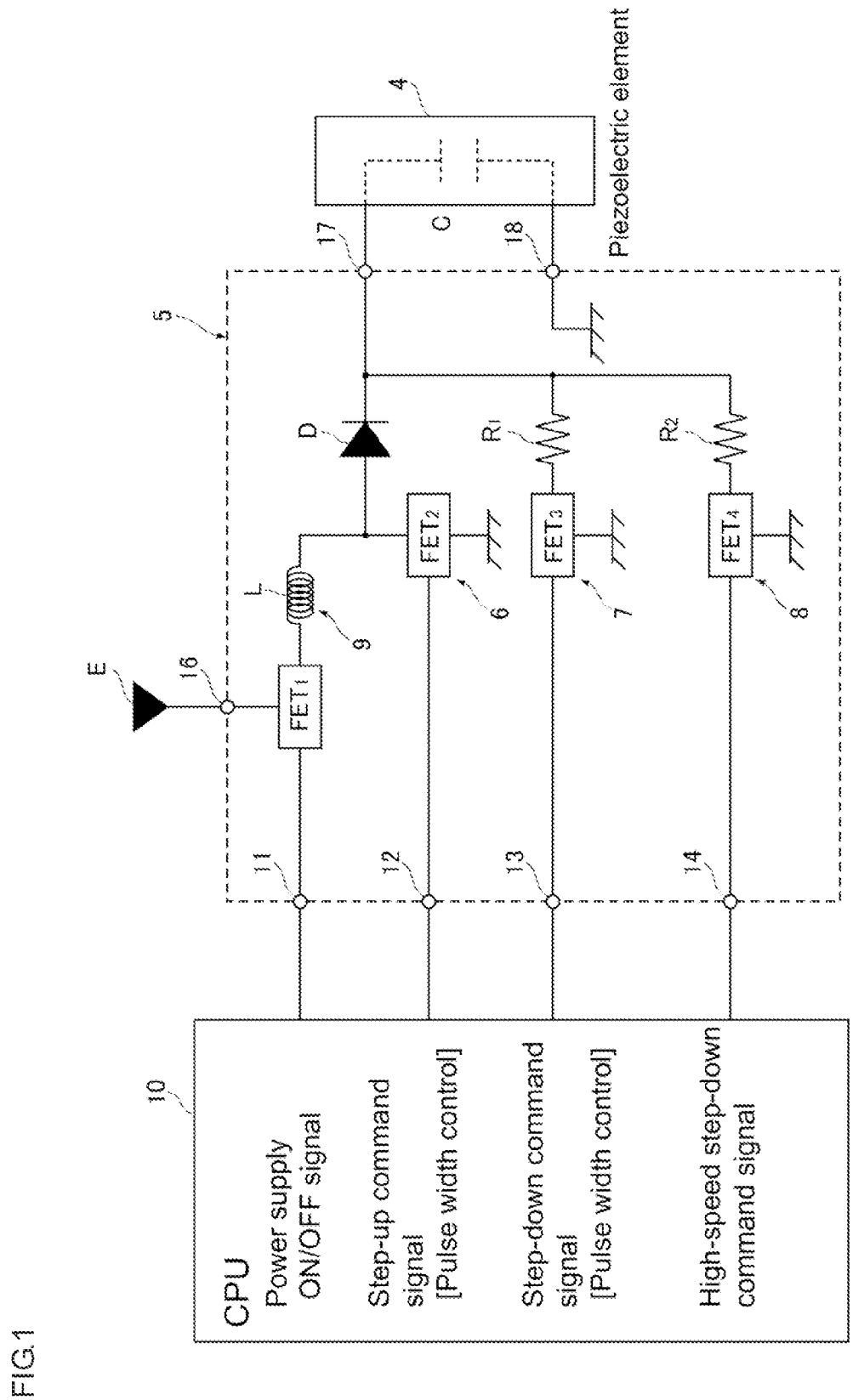
FIG. 1 is a block diagram showing the circuit configuration of a piezoelectric element driving circuit according to the present invention.

Hereinafter, an embodiment of the present invention will be described with reference to the accompanying drawings, wherein like parts are designated by like character references. FIG. 1 is a block diagram showing the circuit configuration of a piezoelectric element driving circuit for a pressure type flow rate control device that is provided with a flow rate self-diagnosis function according to the present invention. In FIG. 1, reference numeral 4 denotes a piezoelectric element, reference numeral 5 denotes a piezoelectric element driving circuit, reference numeral 6 denotes a step-up command circuit, reference numeral 7 denotes a step-down command circuit, reference numeral 8 denotes a high-speed step-down command circuit, reference numeral 9 denotes a step-up voltage supply circuit, and reference numeral 10 denotes an arithmetic device (CPU) of the pressure type flow rate control device. Furthermore, reference character E is a power supply, reference numerals 11, 12, 13, 14 and 16 are respective input terminals to the piezoelectric element driving circuit, and reference numerals 17 and 18 are output terminals to the piezoelectric element 4.

The piezoelectric element 4 itself has a capacitor structure. In the present embodiment, its electrostatic capacity is 5.7 μF, and the total capacity between the input terminals 17 and 18 is 6.7 μF as a matter of the circuit configuration.

The piezoelectric element driving circuit 5, according to the present invention, is composed of the step-up command circuit 6, the step-down command circuit 7, the high-speed step-down command circuit 8, the step-up voltage supply circuit 9, and a piezoelectric element driving voltage is supplied to the piezoelectric element 4 through the terminals 17 and 18. Furthermore, an input voltage is input to the terminal 11, a step-up command signal is input to the terminal 12, and a step-down command signal is input to the terminal 13, respectively, from the arithmetic processing unit (CPU) 10 of the pressure type flow rate control device. Moreover, a high-speed step-down command signal is input to the terminal 14 during a flow rate self-diagnostic (i.e., a diagnostic for determining malfunction in flow rate).

In other words, when a step-up command signal subjected to pulse width control is input to the terminal 12 from the arithmetic processing unit (CPU) to turn on a field-effect transistor $FET_2$ of the step-up command circuit 6, electromotive force is induced in an inductor L of the step-up voltage supply circuit 9 by an input voltage from the terminal 11. Furthermore, when the field-effect transistor $FET_2$ is turned off, the induced electromotive force in the inductor L is superimposed on a power supply voltage from the input terminal 11 to be applied to the piezoelectric element 4 from the output terminal 17. In the case where the voltage applied to the piezoelectric element 4 is increased, the pulse width and the pulse number of the step-up command signal to the terminal 12 are adjusted, and the magnitude of the induced electromotive force in the inductor L and the superimposing number thereof are changed to raise the voltage applied to the piezoelectric element 4.

Furthermore, in contrast thereto, in the case when the voltage applied is decreased, a step-down command signal is input to the terminal 13 from the arithmetic processing unit (CPU) 10 to turn on a field-effect transistor $FET_3$ of the step-down command circuit 7, and the voltage applied (i.e., voltage charged) to the piezoelectric element 4 is discharged through a first discharge circuit composed of a series circuit including resistance $R_1$ and the field-effect transistor $FET_3$ of the step-down command circuit 7. In the embodiment of FIG. 1, it is set that a time constant of the first discharge circuit is equal to $R_1 \times C = 22K\Omega \times 6.7\ \mu F = 147.4$ msec, and the piezoelectric element driving voltage is stepped down at a relatively slow speed. The time constant of the first discharge circuit is preferably set to 50 msec to 100 msec from the standpoint of maintaining the stability of flow rate control by adjusting the piezoelectric element driving voltage.

Moreover, when a high-speed step-down command signal is input to the terminal 14 from the arithmetic processing unit (CPU) 10 during a flow rate self-diagnostic (i.e., a diagnostic for diagnosing malfunction in flow rate), a field-effect transistor $FET_4$ of the high-speed step-down command circuit 8 is turned on, and the voltage applied (voltage charged) to the piezoelectric element 4 is discharged through a second discharge circuit composed of a series circuit of resistance $R_2$ and the field-effect transistor $FET_4$ of the high-speed step-down command circuit 8. More specifically, the time constant of the second discharge circuit composed of the transistor of the high-speed step-down command circuit 8 and the resistance $R_2$ is set to $R_2 \times C = 47\Omega \times 6.7\ \mu F = 0.3$ msec, and the piezoelectric element driving voltage is sharply stepped down. It is desirable that the time constant of the second discharge circuit is kept short, and it has been confirmed that the time constant of the second discharge circuit is optimally set to 0.3 msec or less.

In addition, an operation confirmation test for the partial circuit configuration, in which the high-speed step-down command circuit 8 (i.e., the second discharge circuit) is eliminated by decreasing the time constant of the first discharge circuit of the step-down command circuit 7 that takes charge of normal flow rate control, (i.e., valve opening control by adjusting the piezoelectric element driving voltage), has been carried out. In this case, it is clear that the piezoelectric element driving voltage in a steady flow rate control is destabilized, which brings about a state beyond control from a practical standpoint. Therefore, the circuit configuration adopted in accordance with the present invention is one in which the high-speed step-down command circuit 8 is used only for flow rate self-diagnosis, and the high-speed step-down command circuit 8 is provided together with the step-down command circuit 7 for steady flow rate control.

Figure 2:
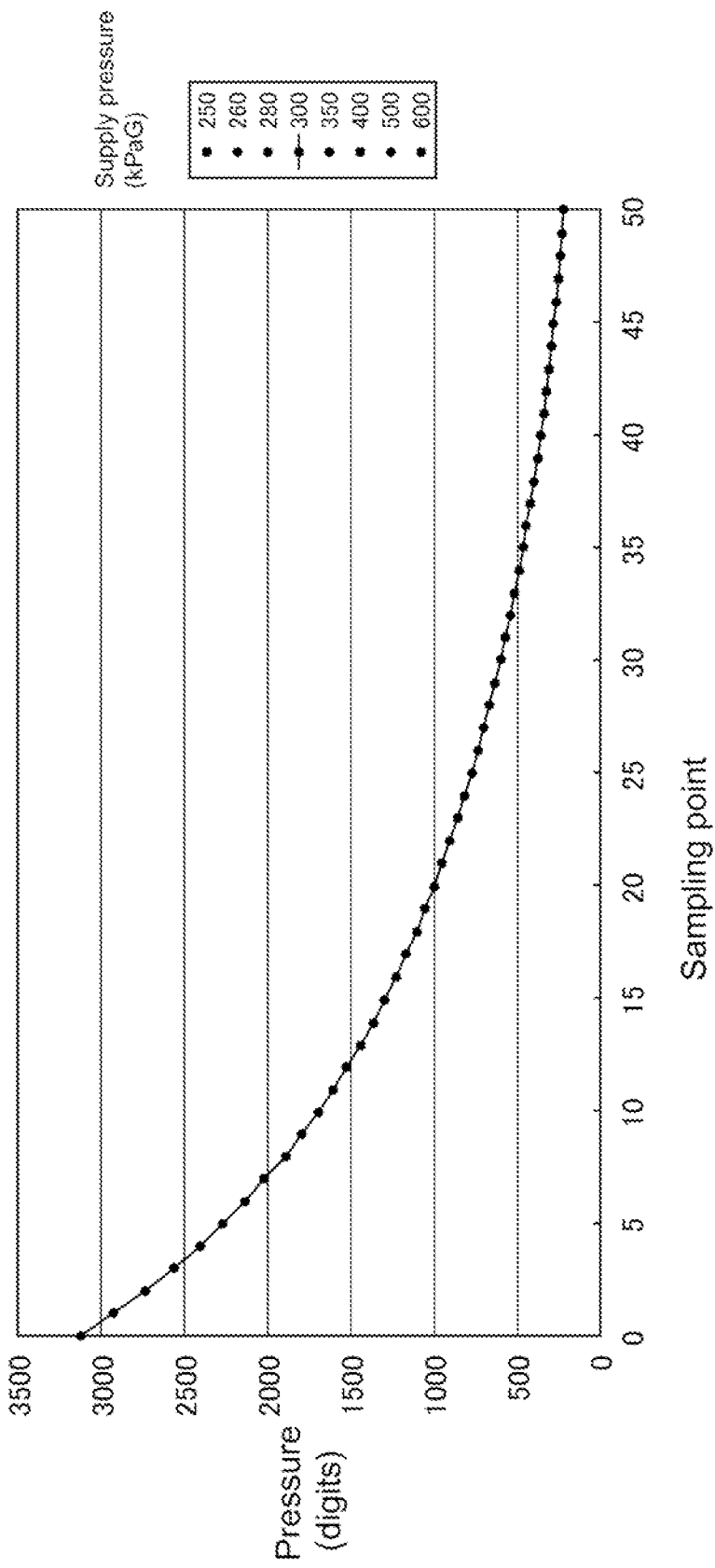
FIG. 2 is a graph showing pressure drop characteristics of a pressure type flow rate control device provided with a piezoelectric element driving unit according to the present invention.

FIG. 2 shows the pressure drop characteristics measured under the same conditions as those in FIG. 6 wherein the piezoelectric element driving circuit 5, according to the present invention, is applied to the FCS type pressure type flow rate control device manufactured by Fujikin Incorporated, which is the same as the conventional FCS type pressure type flow rate control device. As clear from FIG. 2, it is shown that, even when the gas supply pressure applied to the piezoelectric element driving type pressure control valve 1 is changed, the pressure drop characteristics curve maintains substantially the same form, and when the closing time delay of the pressure control valve 1 is reduced by shortening the switching time of the pressure control valve 1 from being fully opened to being completely closed at the start of a flow rate self-diagnosis (that is, by shortening the discharge time of the piezoelectric element driving voltage), the pressure drop characteristics are considerably stabilized as evident by comparing FIGS. 2 and 6.

Figure 3:
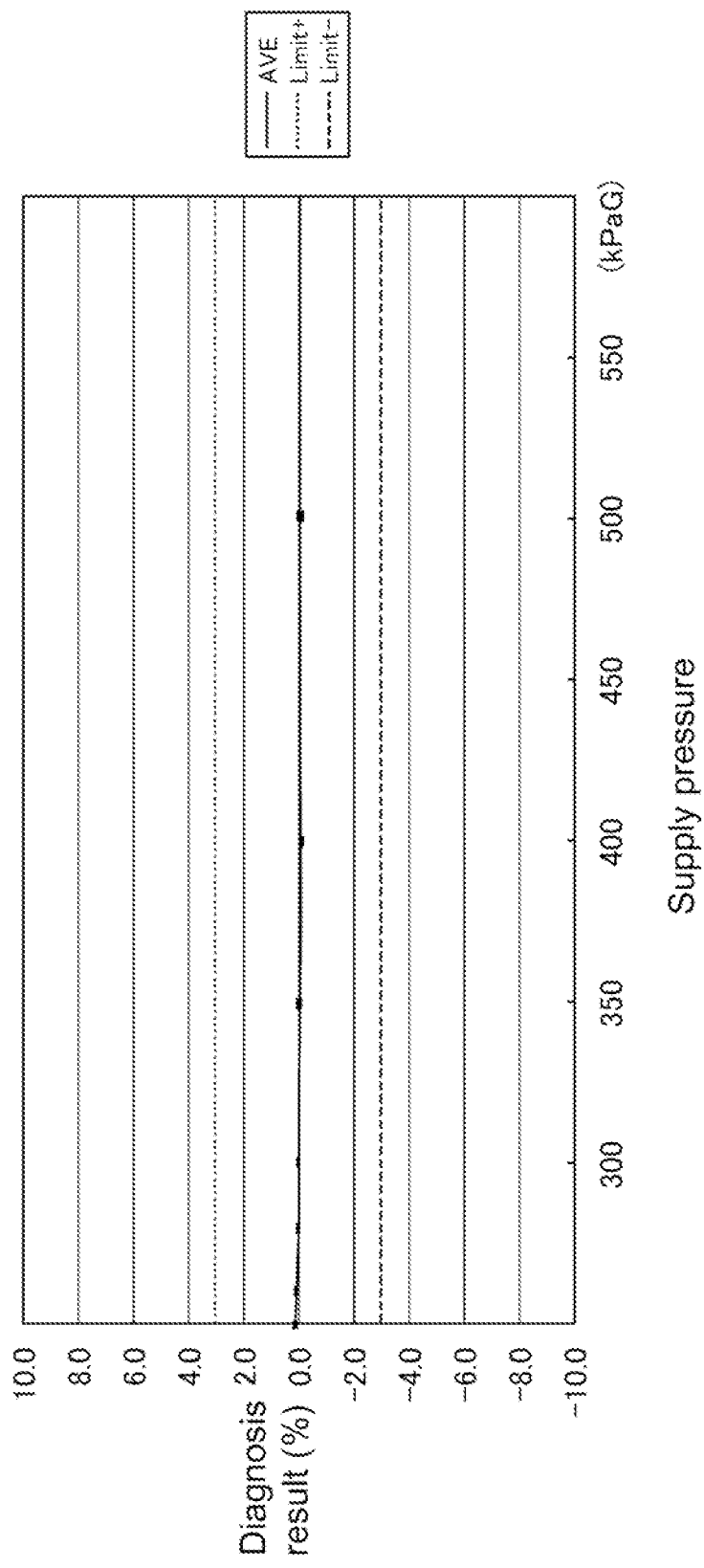
FIG. 3 is a graph showing the supply pressure-dependent characteristics of a flow rate self-diagnosis result of the pressure type flow rate control device provided with the piezoelectric element driving unit according to the present invention.
Figure 7:
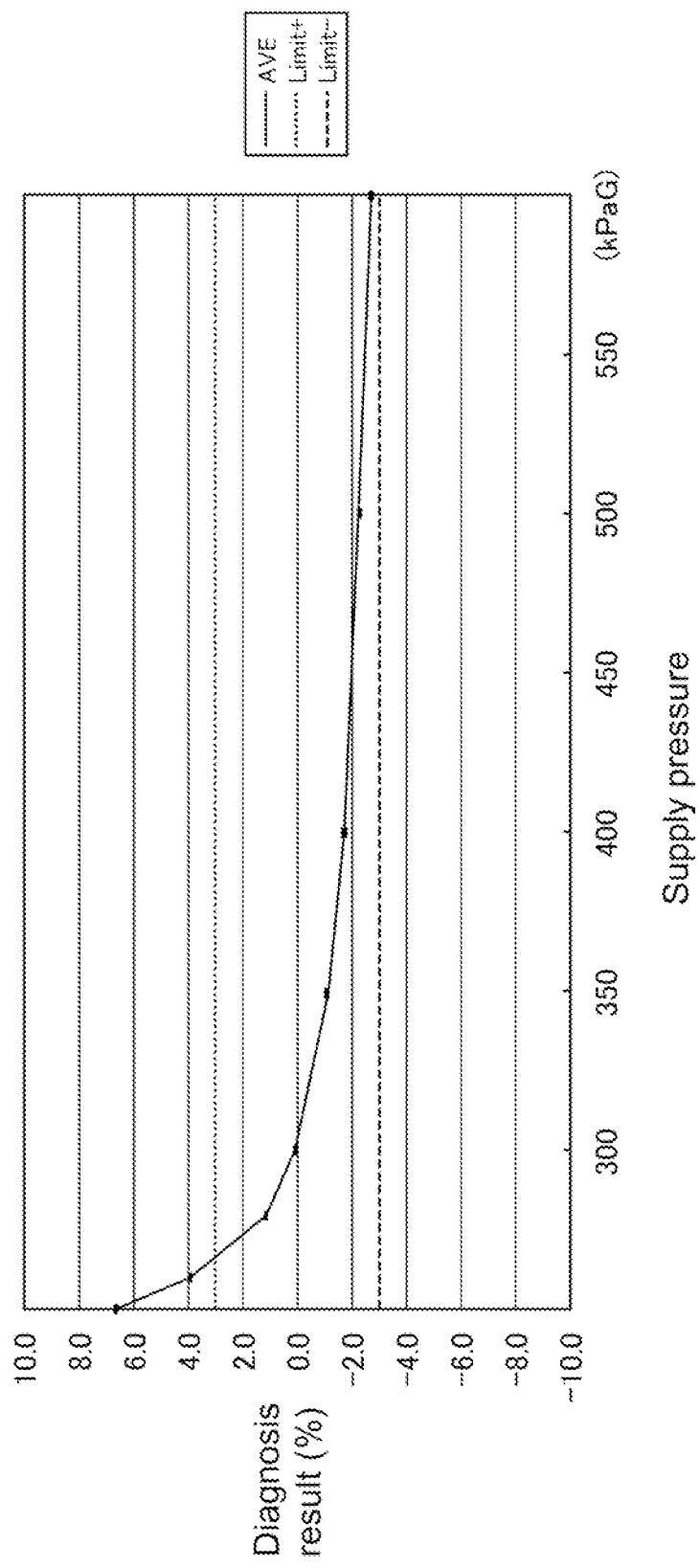
FIG. 7 is a graph showing the relationship between supply pressures (kPaG) and flow rate diagnosis results (%) for diagnosing malfunction in flow rate.
Figure 8:
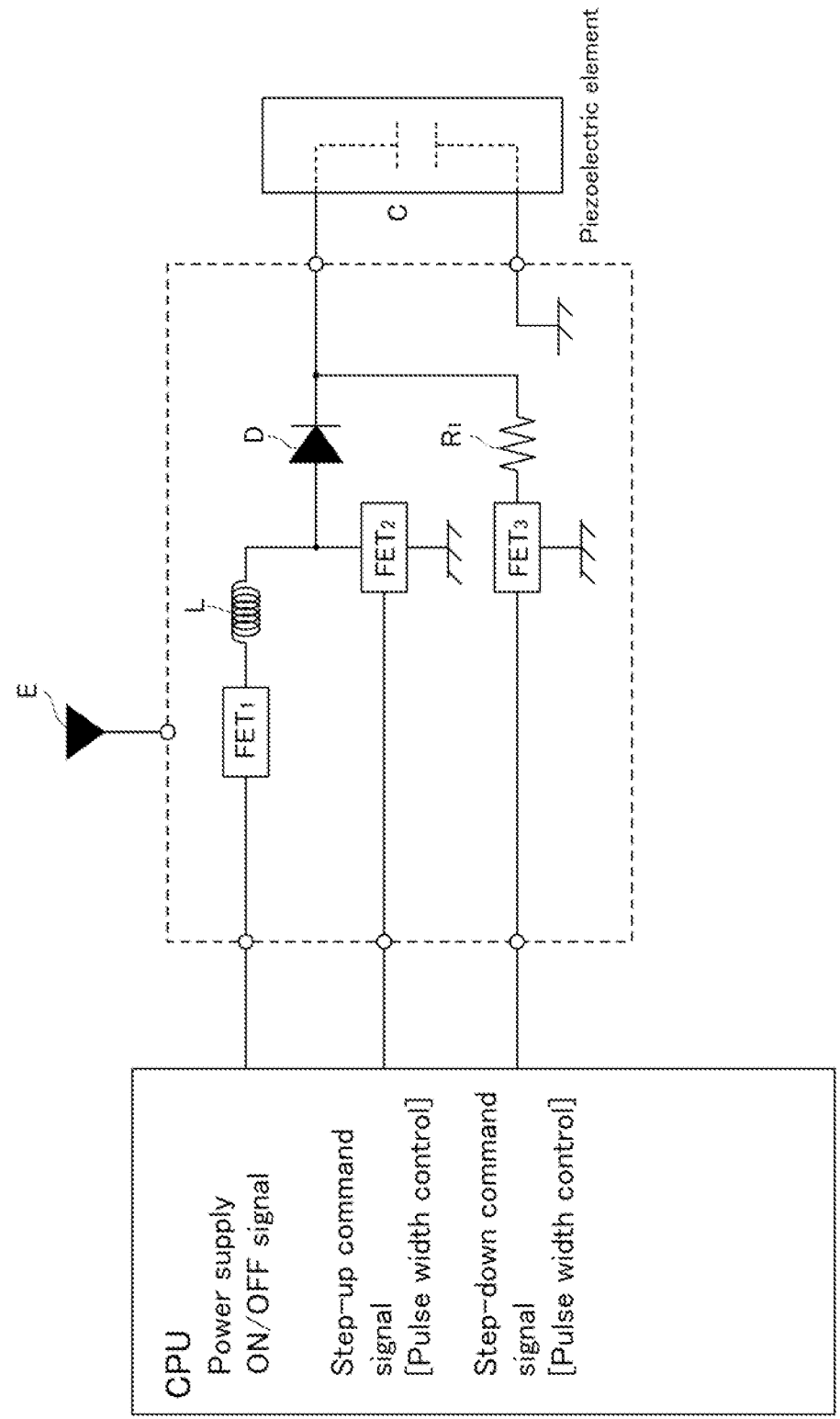
FIG. 8 is a block diagram showing the configuration of a conventional piezoelectric element driving circuit (prior art).

Furthermore, because the measured pressure drop characteristics are stabilized by the circuit configuration employed by the present invention, the diagnosis results for determining malfunction in flow rate calculated on the basis of measured values of the pressure drop characteristics are made highly accurate by necessity. Therefore, the relationship between supply pressures and diagnosis results (%) shown in FIG. 7 (which reflects what is obtainable using what is conventional in the art) becomes a state or result as shown in FIG. 3. In other words, variation in diagnosis results (%) due to fluctuation in supply pressure is considerably improved, and even when the supply pressure is changed, the values of the diagnosis results (%) are free from influence conventionally observed with change in supply pressure.

Because the pressure control valve 1, (e.g., piezoelectric element driving type normally-closed type metal diaphragm valve), provided with the piezoelectric element driving unit 1a used for measuring the pressure drop characteristics of FIG. 2, and the relationship between diagnosis results (%) and supply pressures (kPaG) in FIG. 3 has the same structure as that disclosed in Japanese Published Unexamined Patent Application No. 2005-149075, a detailed description thereof will be omitted here.

Figure 4:
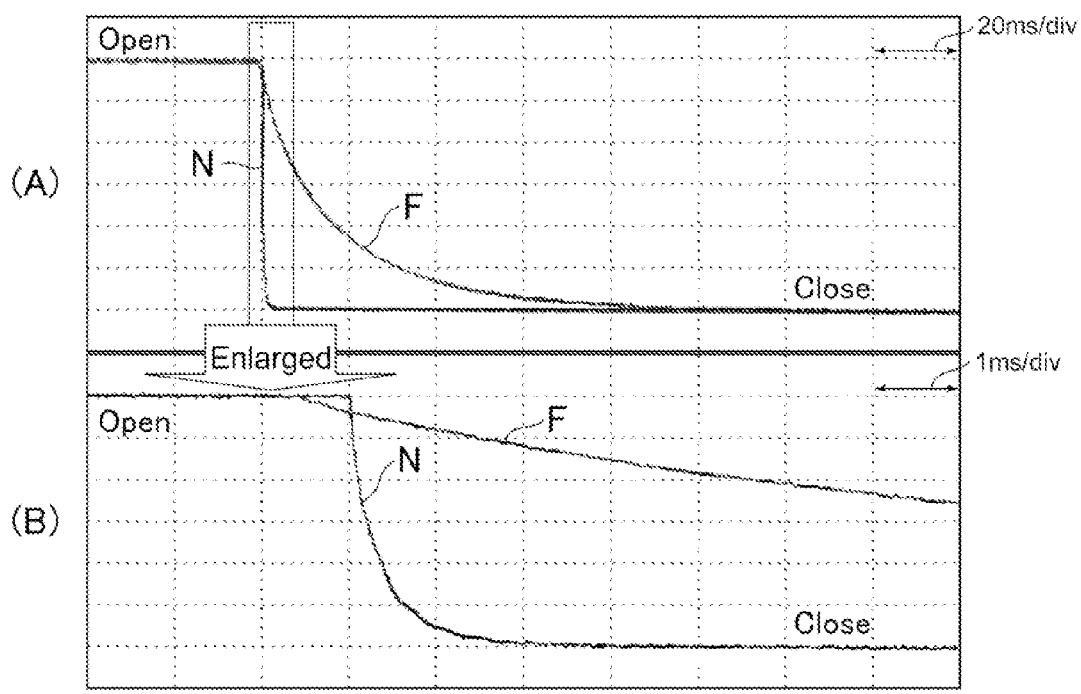
FIG. 4A is a chart comparing the opening and closing speed characteristics of a pressure control valve in the case (F) where a conventional piezoelectric element driving unit is used and in the case (N) where a piezoelectric driving unit of the present invention is used.
FIG. 4B is a chart in which a portion of FIG. 4A is enlarged.
Figure 5:
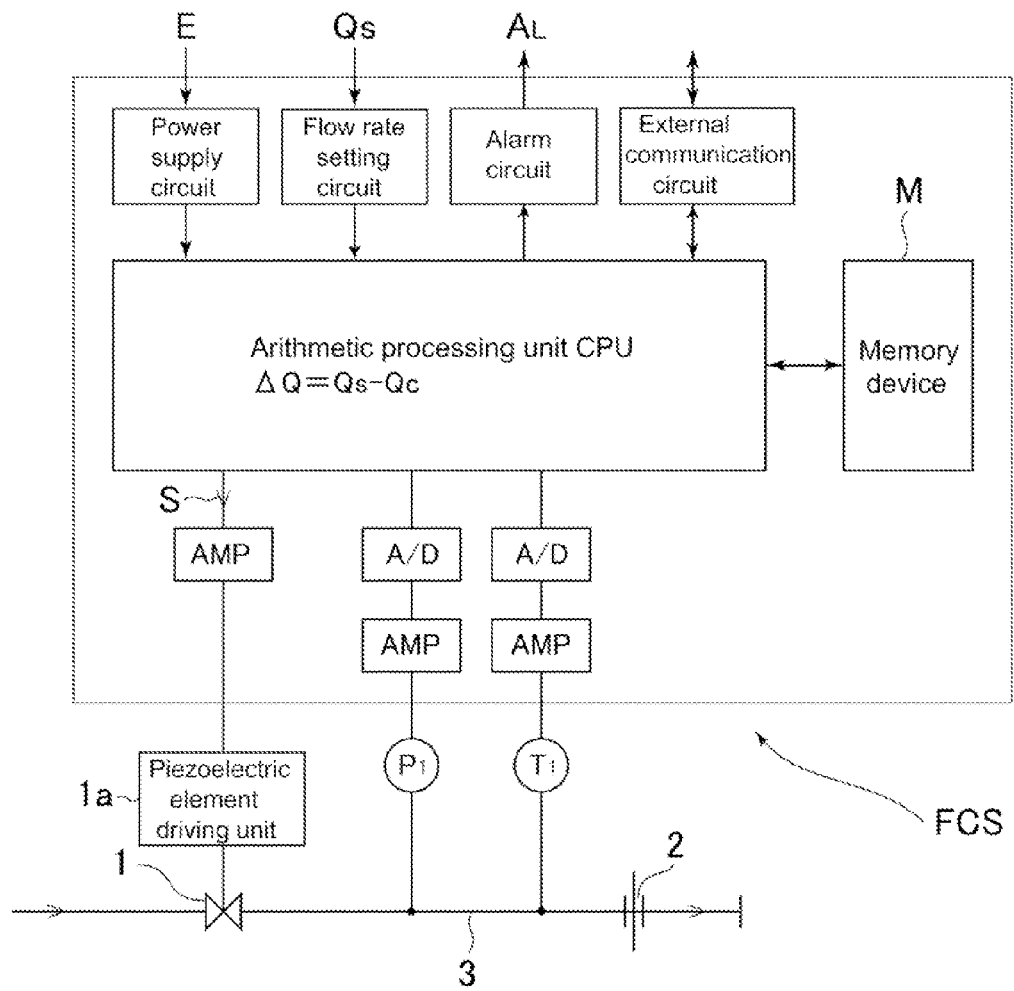
FIG. 5 is a block diagram showing the basic configuration of a conventional pressure type flow rate control device provided with a flow rate self-diagnosis function (prior art).

FIG. 4(A) is a waveform chart showing the state of discharge of a piezoelectric element driving voltage, and the curve F shows the case where a conventional piezoelectric element driving unit is used and wherein a time constant R×C of the discharge circuit is 2KΩ×6.7 μF=13.4 msec, and the curve N shows the case where a piezoelectric element driving unit in accordance with the present invention is used and wherein a time constant R×C of the discharge circuit is 47Ω× 6.5 μF=0.3 msec, respectively. Furthermore, FIG. 4(B) is a chart showing a portion of FIG. 4(A) that is partially enlarged, which shows that the valve closing speed is extremely high when the piezoelectric element driving circuit 5, according to the present invention, is employed in which the high-speed step-down command circuit 8 is provided. Moreover, the field-effect transistor is used as a switching element in the above-described embodiment. Of course, a switching element other than a field-effect transistor may be used as the switching element within the scope of the present invention. As the same applies to the driving unit for the control valve, a driving unit other than a piezoelectric element driving unit, for example, such as a solenoid driving unit, may be used as the driving unit, and any type or any structure of a piezoelectric element may be used. In other words, the present invention is not limited to the particular switching element, the particular driving unit, and/or to the particular piezoelectric element described above.

Industrial Applicability

The control valve driving circuit for the pressure type flow rate control device provided with the flow rate self-diagnosis function, according to the present invention, may be applied to control valves for all kinds of purposes, and particularly is useful as a driving circuit for a piezoelectric element driving type high-speed opening and closing type flow rate/pressure automatic control valve.

The invention claimed is:

1. A pressure control valve driving circuit of a pressure type flow rate control device that is provided with a flow rate self-diagnosis function that contrasts initial pressure drop characteristics data measured and stored in advance in a memory of the pressure type flow rate control device with second pressure drop characteristics data obtained during a flow rate diagnosis, wherein the second pressure drop characteristics data are measured under conditions that are the same as those when the measurement corresponding to the initial pressure drop characteristics was obtained, wherein the contrast of the initial pressure drop characteristics data and the second pressure drop characteristics data permits detection of malfunction in flow rate control from a difference between both the initial pressure drop characteristics data and the second pressure drop characteristics data, wherein the pressure control valve driving circuit comprises:

a closing circuit operable to close a control valve at high speed, wherein the closing circuit is operably connected in parallel with a control valve driving circuit.

2. The pressure control valve driving circuit of the pressure type flow rate control device that is provided with the flow rate self-diagnosis function according to claim 1, wherein the pressure control valve driving circuit is a pressure control valve piezoelectric element driving circuit that comprises a first discharge circuit and a second discharge circuit, and the pressure control valve piezoelectric element driving circuit is operably connected to operate a piezoelectric element of a piezoelectric element driving type pressure control valve, and the closing circuit operable to close the control valve at high speed is the second discharge circuit that rapidly discharges a first piezoelectric element driving voltage applied to the piezoelectric element according to a first high-speed step-down command signal received from an arithmetic processing unit CPU operably connected to the pressure control valve piezoelectric element driving circuit, through a first high-speed step-down command circuit to step down the first piezoelectric element driving voltage.

3. The pressure control valve driving circuit of the pressure type flow rate control device that is provided with the flow rate self-diagnosis function according to claim 2, wherein the second discharge circuit comprises a series circuit of a first low-resistance and a first switching element of the first high-speed step-down command circuit, wherein the first high-speed step-down command circuit is made conductive according to input of the first high-speed step-down command signal from the arithmetic processing unit CPU to the pressure control valve driving circuit.

4. The pressure control valve driving circuit of the pressure type flow rate control device that is provided with the flow rate self-diagnosis function according to claim 2, wherein the first discharge circuit is operably connected in parallel with the second discharge circuit, wherein the first discharge circuit discharges a second piezoelectric element driving voltage applied to the piezoelectric element according to a second step-down command signal received from the arithmetic processing unit CPU of the pressure type flow rate control device, through a second step-down command circuit to step down the second piezoelectric element driving voltage.

5. The pressure control valve driving circuit of the pressure type flow rate control device that is provided with the flow rate self-diagnosis function according to claim 4, wherein the first discharge circuit comprises a series circuit of a second high-resistance and a second switching element of the second step-down command circuit, wherein the second step-down command circuit is made conductive according to input of the second step-down command signal from the arithmetic processing unit CPU to the pressure control valve driving circuit.

6. The pressure control valve driving circuit of the pressure type flow rate control device that is provided with the flow rate self-diagnosis function according to claim 2, wherein a time constant of the second discharge circuit is set to 0.3 msec or less.

7. The pressure control valve driving circuit of the pressure type flow rate control device that is provided with the flow rate self-diagnosis function according to claim 3, wherein the first discharge circuit is operably connected in parallel with-the second discharge circuit, wherein the first discharge circuit discharges a second piezoelectric element driving voltage applied to the piezoelectric element according to a second step-down command signal received from the arithmetic processing unit CPU of the pressure type flow rate control device, through a second step-down command circuit to step down the second piezoelectric element driving voltage.

8. The pressure control valve driving circuit of the pressure type flow rate control device that is provided with the flow rate self-diagnosis function according to claim 7, wherein the first discharge circuit comprises a series circuit of a second high-resistance and a second switching element of the second step-down command circuit, wherein the second step-down command circuit is made conductive according to input of the second step-down command signal from the arithmetic processing unit CPU to the pressure control valve driving circuit.

9. The pressure control valve driving circuit of the pressure type flow rate control device that is provided with the flow rate self-diagnosis function according to claim 3, wherein a time constant of the second discharge circuit is set to 0.3 msec or less.

10. The pressure control valve driving circuit of the pressure type flow rate control device that is provided with the flow rate self-diagnosis function according to claim 4, wherein a time constant of the second discharge circuit is set to 0.3 msec or less.

11. The pressure control valve driving circuit of the pressure type flow rate control device that is provided with the flow rate self-diagnosis function according to claim 7, wherein a time constant of the second discharge circuit is set to 0.3 msec or less.

12. A pressure type flow rate control device that is provided with a flow rate self-diagnosis function that contrasts initial pressure drop characteristics data measured and stored in advance in a memory of the pressure type flow rate control device with second pressure drop characteristics data obtained during a flow rate diagnosis, wherein the second pressure drop characteristics data are measured under conditions that are the same as those when the measurement corresponding to the initial pressure drop characteristics was obtained, wherein the contrast of the initial pressure drop characteristics data and the second pressure drop characteristics data permits detection of malfunction in flow rate control from a difference between both the initial pressure drop characteristics data and the second pressure drop characteristics data, wherein the pressure type flow rate control device comprises:
(a) a control valve; and
(b) a pressure control valve driving circuit that comprises
   i. a closing circuit operable to close the control valve at high speed, wherein the closing circuit is operably connected in parallel with a control valve driving circuit.

13. The pressure type flow rate control device according to claim 12, further comprising:
(c) a piezoelectric element, wherein the pressure control valve driving circuit is a pressure control valve piezoelectric element driving circuit that comprises a first discharge circuit and a second discharge circuit, and the pressure control valve piezoelectric element driving circuit is operably connected to operate the piezoelectric element, and the closing circuit operable to close the control valve at high speed is the second discharge circuit that rapidly discharges a first piezoelectric element driving voltage applied to the piezoelectric element according to a first high-speed step-down command signal received from an arithmetic processing unit CPU operably connected to the pressure control valve piezoelectric element driving circuit, through a first high-speed step-down command circuit to step down the first piezoelectric element driving voltage.

14. The pressure type flow rate control device according to claim 13, wherein the second discharge circuit comprises a series circuit of a first low-resistance and a first switching element of the first high-speed step-down command circuit, wherein the first high-speed step-down command circuit is made conductive according to input of the first high-speed step-down command signal from the arithmetic processing unit CPU to the pressure control valve driving circuit.

15. The pressure type flow rate control device according to claim 14, wherein the first discharge circuit is operably connected in parallel with the second discharge circuit, wherein the first discharge circuit discharges a second piezoelectric element driving voltage applied to the piezoelectric element according to a second step-down command signal received from the arithmetic processing unit CPU of the pressure type flow rate control device, through a second step-down command circuit to step down the second piezoelectric element driving voltage.

16. The pressure type flow rate control device according to claim 15, wherein the first discharge circuit comprises a series circuit of a second high-resistance and a second switching element of the second step-down command circuit, wherein the second step-down command circuit is made conductive according to input of the second step-down command signal from the arithmetic processing unit CPU to the pressure control valve driving circuit.

17. The pressure type flow rate control device according to claim 15, wherein a time constant of the second discharge circuit is set to 0.3 msec or less.

18. The pressure type flow rate control device according to claim 17, wherein a time constant of the first discharge circuit is set to between 50 msec to 100 msec.

19. The pressure type flow rate control device according to claim 12, further comprising:
(c) a piezoelectric element; and
(d) an arithmetic processing unit,
wherein the pressure control valve driving circuit is a pressure control valve piezoelectric element driving circuit that further comprises
   ii. a step-up command circuit;
   iii. a first high-speed step-down command circuit;
   iv. a second step-down command circuit; and
   v. a step-up voltage supply circuit;
wherein the step-up command circuit, the first high-speed step-down command circuit, the second step-down command circuit and the step-up voltage supply circuit are each operably connected to receive input from the arithmetic processing unit of the pressure type flow rate control device, and
wherein the step-up command circuit, the first high-speed step-down command circuit, the second step-down command circuit and the step-up voltage supply circuit are operably connected to one another so as to supply a first piezoelectric element driving voltage to the piezoelectric element of the pressure type flow rate control device.

20. The pressure type flow rate control device according to claim 19, wherein the pressure control valve piezoelectric element driving circuit is operably connected to operate the piezoelectric element by supplying the first piezoelectric element driving voltage to the piezoelectric element, and
wherein the second step-down command circuit includes a first discharge circuit and the first high-speed step-down command circuit includes a second discharge circuit, and the closing circuit operable to close the control valve at high speed is the second discharge circuit that rapidly discharges the first piezoelectric element driving voltage applied to the piezoelectric element according to a first high-speed step-down command signal received from the arithmetic processing unit operably connected to the pressure control valve piezoelectric element driving circuit, through the first high-speed step-down command circuit to step down the first piezoelectric element driving voltage, and wherein the first discharge circuit is operably connected in parallel with the second discharge circuit, wherein the first discharge circuit discharges a second piezoelectric element driving voltage applied to the piezoelectric element according to a second step-down command signal received from the arithmetic processing unit of the pressure type flow rate control device, through the second step-down command circuit to step down the first piezoelectric element driving voltage.

\* \* \* \* \*